(12) United States Patent
Yamaguchi (10) Patent No.: US 10,180,571 B2
(45) Date of Patent: Jan. 15, 2019

(54) HEAD-UP DISPLAY APPARATUS (71) Applicant: DENSO CORPORATION, Kariya, Aichi-pref. (JP)

(72) Inventor: Masayuki Yamaguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/509,765

(22) PCT Filed: Aug. 25, 2015

(86) PCT No.: PCT/JP2015/004254
§ 371 (c)(1),
(2) Date: Mar. 8, 2017

(87) PCT Pub. No.: WO2016/047035
PCT Pub. Date: Mar. 31, 2016

(65) Prior Publication Data
US 2017/0299862 A1    Oct. 19, 2017

(30) Foreign Application Priority Data
Sep. 23, 2014  (JP) .................... 2014-193193

(51) Int. Cl.
*G02B 27/14* (2006.01)
*G02B 23/24* (2006.01)
(Continued)

(52) U.S. Cl.
CPC .......... *G02B 27/0101* (2013.01); *B60K 35/00* (2013.01); *B60R 1/00* (2013.01);
(Continued)

(58) Field of Classification Search
CPC ......... G02F 1/133504; G02F 1/133603; G02F 2201/38; G02F 1/133606; G02F 1/133615;
(Continued)

(56) References Cited

U.S. PATENT DOCUMENTS 3,758,196 A * 9/1973 Weiss ..................... G02B 17/08
359/629
2012/0099032 A1 4/2012 Ishikawa
(Continued)

FOREIGN PATENT DOCUMENTS

JP   2007148092 A   6/2007
JP   2010145746 A   7/2010
(Continued)

*Primary Examiner* — Brandi Thomas
(74) *Attorney, Agent, or Firm* — Harness, Dickey & Pierce, P.L.C.

(57) ABSTRACT

A head-up display apparatus includes a light source portion that projects light from a light source, a screen member that has a diffusion portion inclined with respect to a hypothetical reference line that extends along a projection direction of the light from the light source, and a light-transmissive optical element that is disposed between the light source portion and the diffusion portion and has a first optical surface exposed to the light source portion and a second optical surface exposed to the diffusion portion. The projection direction corresponds to a center of the image. The diffusion portion diffuses the light from the light source. A distance between the first optical surface and the second optical surface increases in a direction from a side on which the diffusion portion is closer to the light source portion to a side on which the diffusion portion is farther from the light source portion.

7 Claims, 8 Drawing Sheets

(51) Int. Cl.
    *G02B 27/01*      (2006.01)
    *B60K 35/00*      (2006.01)
    *B60R 1/00*      (2006.01)
    *G02B 26/10*      (2006.01)
    *G02B 5/02*      (2006.01)
    *G02B 5/04*      (2006.01)

(52) U.S. Cl.
    CPC .... *G02B 26/101* (2013.01); *B60K 2350/2052* (2013.01); *B60K 2350/2065* (2013.01); *B60R 2300/205* (2013.01); *G02B 5/0284* (2013.01); *G02B 5/04* (2013.01); *G02B 26/10* (2013.01); *G02B 2027/0118* (2013.01)

(58) Field of Classification Search
    CPC ...... G02F 2001/133507; G02B 5/0268; G02B 5/0278; G02B 1/118; G02B 5/0236; G02B 5/0252; G02B 5/0284; G02B 5/32; G02B 26/023; G02B 5/021; G02B 1/14; G02B 27/2292; G02B 5/0257; G02B 5/124; G02B 5/136; G02B 6/002; G02B 6/0023; G02B 6/0028; G02B 6/0051; G02B 6/00
    USPC .................................................. 359/619–630
    See application file for complete search history.

(56) References Cited

U.S. PATENT DOCUMENTS

2014/0092377 A1* 4/2014 Liu ........................ G01N 21/23
    356/51
2014/0092481 A1* 4/2014 Hudson ................... G02B 5/02
    359/630

FOREIGN PATENT DOCUMENTS

| | | |
|---|---|---|
| JP | 2012093506 A | 5/2012 |
| JP | 2015059969 A | 3/2015 |
| JP | 2015146012 A | 8/2015 |

\* cited by examiner

HEAD-UP DISPLAY APPARATUS

CROSS REFERENCE TO RELATED APPLICATIONS

The application is a U.S. National Phase Application under 35 U.S.C. 371 of International Application No. PCT/JP2015/004254 filed on Aug. 25, 2015 and published in Japanese as WO 2016/047035 A1 on Mar. 31, 2016. This application is based on and claims the benefit of priority from Japanese Patent Application No. 2014-193193 filed on Sep. 23, 2014. The entire disclosures of all of the above applications are incorporated herein by reference.

TECHNICAL FIELD

The present disclosure relates to a head-up display apparatus that is mounted on a mobile object, and projects an image onto a projection member to display the image as a virtual image visible to an occupant.

BACKGROUND ART

A head-up display apparatus that is mounted on a mobile object, and projects an image onto a projection member to display the image as a virtual image visible to an occupant is conventionally known. A head-up display apparatus described in Patent literature 1 includes a light source portion that projects light from a light source, and a screen member having a diffusion portion that diffuses the light from the light source. The head-up display apparatus further includes a light-transmissive optical element that is disposed between the light source portion and the diffusion portion, has a first optical surface exposed to the light source portion and a second optical surface exposed to the diffusion portion, and transmits the light from the light source.

The inventor of the present application has found the following.

When the head-up display apparatus is mounted on the mobile object, the diffusion portion may need to be inclined due to mounting space and some reason. In such a case, when the light-transmissive optical element described in Patent literature 1 is adopted, a formed image may vary depending on sites of the image due to the inclination, causing variation in visibility. In addition, noise such as double image may be generated in an image by multiple reflections in the light-transmissive optical element.

PRIOR ART LITERATURE

Patent Literature

Patent Literature 1: JP 2010-145746 A

SUMMARY OF INVENTION

An object of the present disclosure is to provide a head-up display apparatus having high visibility of a virtual image.

A head-up display apparatus according to one example of the present disclosure is mounted on a mobile object and projects an image onto a projection member to display the image as a virtual image visible to an occupant. The head-up display apparatus includes: a light source portion that projects light from a light source; a screen member having a diffusion portion inclined with respect to a hypothetical reference line that extends along a projection direction of the light from the light source, the projection direction corresponding to a center of the image, the diffusion portion diffusing the light from the light source; and a light-transmissive optical element that is disposed between the light source portion and the diffusion portion and has a first optical surface exposed to the light source portion and a second optical surface exposed to the diffusion portion, the light-transmissive optical element transmitting the light from the light source. A distance between the first optical surface and the second optical surface increases in a direction from a side on which the diffusion portion is closer to the light source portion to a side on which the diffusion portion is farther from the light source portion.

According to the head-up display apparatus, since the diffusion portion is inclined with respect to a reference line, a distance between the light source portion and the diffusion portion varies depending on sites of the image. In the light-transmissive optical element disposed between the light source portion and the diffusion portion, a distance between the first optical surface near the light source portion and the second optical surface near the diffusion portion increases as the diffusion portion is farther from the light source portion. Thus, light from the light source, which passes the farther-side of the diffusion portion, passes through the thicker medium, and is focused on the farther side of the second optical surface. Therefore, light can be focused at each site of the image in the diffusion portion according to the distance between the light source portion and the diffusion portion.

Further, the light that is projected from the light source and reflected on the second optical surface, and the light that is projected from the light source and passes through the second optical surface without being reflected due to the first optical surface inclined with respect to the second optical surface reflect in different directions. Thus, the multiple-reflected light from the light source is guided to the side surface of the farther-side of the diffusion portion. With this, it is possible to suppress noise such as double image by separating the multiple-reflected light from transmitted light from the light source without reflection. Thus, it is possible to provide the head-up display apparatus capable of displaying a highly-visible virtual image.

BRIEF DESCRIPTION OF DRAWINGS

The above and other objects, features, and advantages of the present disclosure will become more apparent from the following detailed description with reference to the accompanying drawings, in the drawings.

EMBODIMENTS FOR CARRYING OUT INVENTION

An embodiment of the present disclosure will be described below with reference to the drawings.

Figure 1:
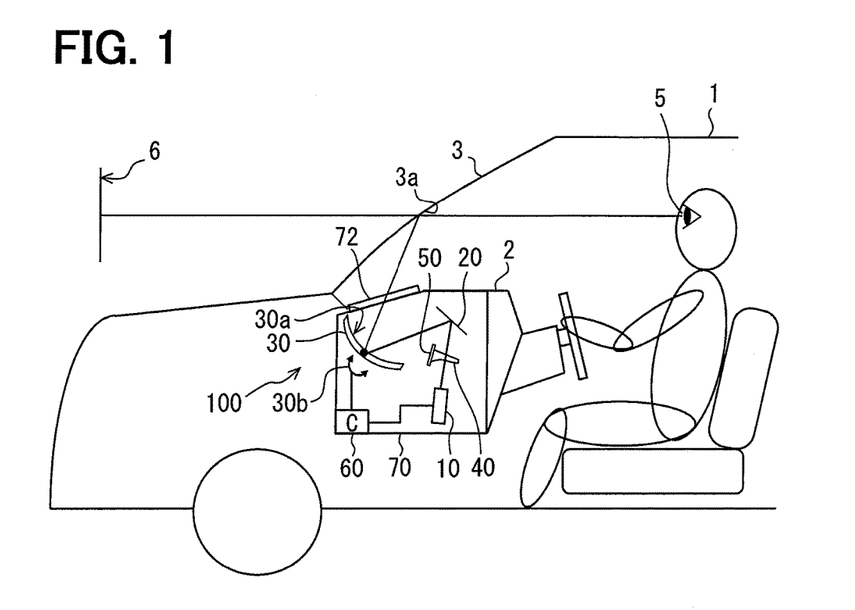
FIG. 1 is a schematic view illustrating a state where an HUD apparatus according to an embodiment is mounted on a vehicle.

A head-up display apparatus 100 according to the embodiment of the present disclosure in FIG. 1 is mounted on a vehicle 1 that is a kind of a mobile object (a moving body), and is accommodated in an instrument panel 2. The head-up display apparatus will be hereinafter referred to as an HUD apparatus. The HUD apparatus 100 projects an image onto a windshield 3 that is a projection member of the vehicle 1. Accordingly, the HUD apparatus 100 produces a virtual image visible to an occupant of the vehicle 1. That is, image light reflected on the windshield reaches an eye 5 of the occupant inside of the vehicle 1, and the occupant recognizes the light. Then, the occupant can recognize various pieces of information displayed as a virtual image 6. Examples of various pieces of information displayed as the virtual image 6 include vehicle state values such as vehicle speed and remaining fuel amount, road information, and vehicle information such as field-of-view assistance information.

On an indoor surface of the windshield 3 of the vehicle 1, a projection surface 3a, onto which an image is projected, is a curved concave surface or a flat surface. The indoor surface and the outdoor surface of the windshield 3 may have an angle difference therebetween for overlapping the virtual images 6 reflected on the surfaces. Alternatively, the windshield 3 may be provided with an evaporated membrane or film for suppressing brightness of the virtual image 6, which is caused by reflection on the outdoor surface. Further, in place of the windshield 3, a combiner separated from the vehicle 1, as the projection member, may be provided in the vehicle 1, and an image may be projected on the combiner.

Figure 2:
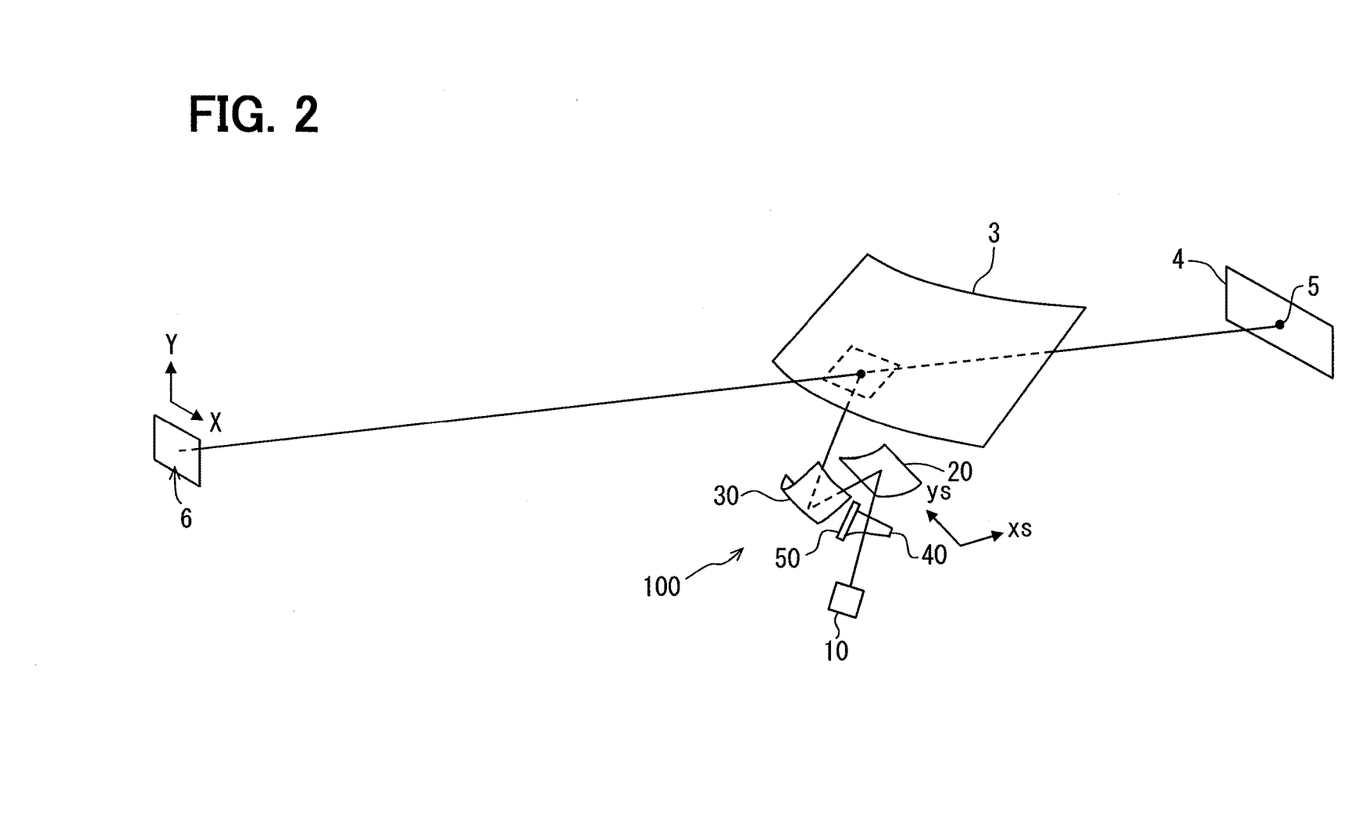
FIG. 2 is a schematic view illustrating schematic configuration of the HUD apparatus in the embodiment.

As illustrated in FIG. 2, the virtual image 6 is displayed as a rectangle using a horizontal direction of the vehicle 1 as a longer direction that is an X direction and a vertical direction of the vehicle 1 as a shorter direction that is a Y direction.

As illustrated in FIGS. 1 and 2, the HUD apparatus 100 includes, in a housing 70, a controller 60, a light source portion 10, a screen member 20, a concave mirror 30, a light-transmissive optical element 40, and a light-shield member 50.

The controller 60 is a control circuit configured of an arithmetic processing device, a memory, or the like. As illustrated in FIG. 1, the controller 60 is electrically connected to the light source portion 10 and the concave mirror 30.

Figure 3:
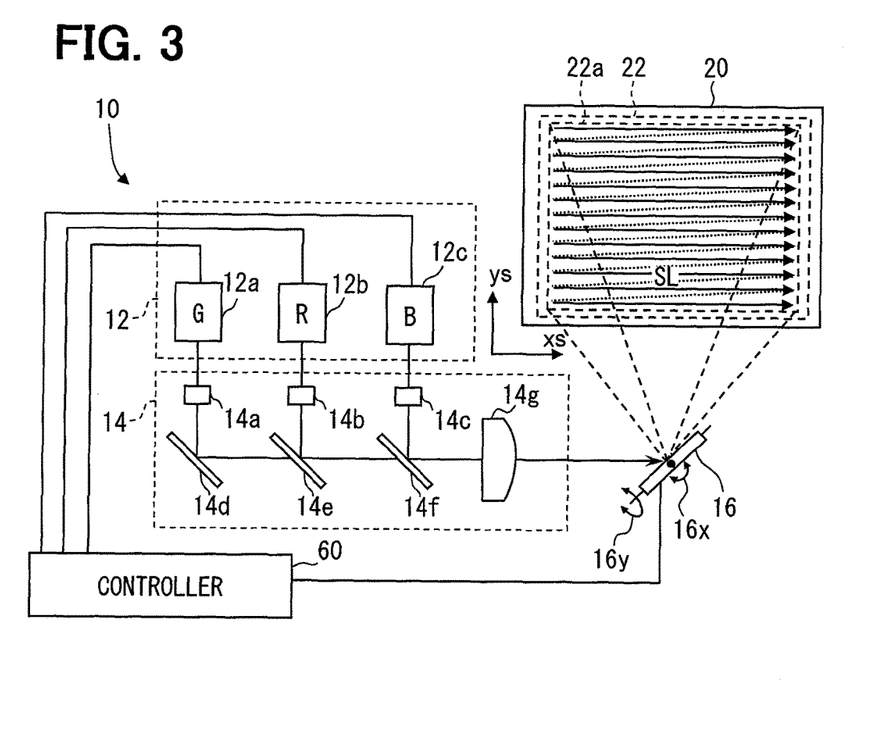
FIG. 3 is a schematic view illustrating configuration of a light source portion in the embodiment and describing scanning of a scanning mirror.

As illustrated in FIG. 3, the light source portion 10 in the present embodiment includes a laser scanner capable of projecting light from a light source, and has an oscillation unit 12, a light guide unit 14, and a MEMS (Micro Electro Mechanical System) scan mirror 16.

The oscillation unit 12 mainly includes three laser oscillators 12a to 12c. The laser oscillators 12a to 12c oscillate respective laser beams of different color phases (hues) in the form of light flux. For example, the laser oscillator 12a oscillates a green laser flux having a peak wavelength in the range of 490 nm to 530 nm, preferably 515 nm. For example, the laser oscillator 12b oscillates a red laser flux having a peak wavelength in the range of 600 nm to 650 nm, preferably 640 nm. For example, the laser oscillator 12c oscillates a blue laser flux having a peak wavelength in the range of 430 nm to 470 nm, preferably 450 nm.

Here, the oscillation unit 12 is electrically connected to the controller 60. In response to an electric signal from the controller 60, the oscillation unit 12 oscillates laser fluxes. Then, three colored laser beams oscillated from the laser oscillators 12a to 12c can be added and mixed to produce various colors. The laser fluxes oscillated from the laser oscillators 12a to 12c are incident on shaping lenses 14a, 14b, and 14c of the light guide unit 14, respectively.

The light guide unit mainly includes the three shaping lenses 14a to 14c, three dichroic filters 14d, 14e, and 14f, and a condensing lens 14g. The three shaping lenses 14a to 14c are separated from the laser oscillators 12a to 12c, respectively, for example, by 0.5 mm in the travelling direction of the laser fluxes. The shaping lenses 14a to 14c refract respective laser fluxes to shape the laser fluxes.

The three dichroic filters 14d to 14f are separated from the shaping lenses 14a to 14c, respectively, for example, by 0.5 mm in the travelling direction of the laser fluxes. The dichroic filters 14d to 14f each reflect the laser flux of specific wavelength among the laser fluxes transmitted through the shaping lenses 14a to 14c, and transmit the laser fluxes of other wavelengths. Specifically, the dichroic filter 14d corresponding to the shaping lens 14a reflects the green laser flux. The dichroic filter 14e corresponding to the shaping lens 14b reflects the red laser flux, and transmits the other laser fluxes. The dichroic filter 14f corresponding to the shaping lens 14c reflects the blue laser flux, and transmits the other laser fluxes.

Here, the dichroic filter 14d is separated from the dichroic filter 14e, for example, by 6 mm in the travelling direction of the reflected green laser flux. The dichroic filter 14f is separated from the dichroic filter 14e, for example, by 6 mm in the travelling direction of the reflected red laser flux. With this arrangement, the green laser flux reflected by the dichroic filter 14d passes through the dichroic filter 14e, and is mixed with the red laser flux reflected by the dichroic filter 14e. The green laser flux and the red laser flux pass through the dichroic filter 14f, and are mixed with the blue laser flux reflected by the dichroic filter 14f. In this manner, the three colored laser beams are mixed.

The dichroic filter 14f is separated from the condensing lens 14g, for example, by 4 mm in the travelling direction of the transmitted laser flux. The condensing lens 14g is a plano-convex lens that is flat on the side of the dichroic filter 14f and is convex on the side of the scan mirror 16. The condensing lens 14g condenses the laser fluxes from the dichroic filters 14d to 14f. The laser flux transmitted through the condensing lens 14g is incident on the scan mirror 16.

The scan mirror 16 is an MEMS mirror that performs scanning in terms of time in the projection direction of the laser flux. The scan mirror 16 has a film-like reflective surface 16a coated with aluminum by evaporation, which is opposed to the condensing lens 14g with a distance of 5 mm. The reflective surface 16a can rotate about two rotational axes 16x, 16y that are orthogonal to each other along the reflective surface 16a.

The scan mirror 16 is electrically connected to the controller 60, and can turn the orientation of the reflective surface 16a in response to a scan signal to perform scanning in the projection direction of the laser flux.

In this manner, the light source portion 10 projects the laser flux that is light from the light source onto a projection area 22a of a diffusion portion 22 of the screen member 20 via the light-transmissive optical element 40 while the laser flux scans the projection area in the projection direction in terms of time. Specifically, the laser flux sequentially scans the projection area in the projection direction, which is an arrow direction along multiple scan lines SL as illustrated in FIG. 3. According to control of the controller 60, the laser flux is intermittently projected in a pulsed manner as the projected position of the laser flux in the projection area 22a moves, thereby drawing and forming an image. For example, the image is drawn in the projection area 22a at 60 frames per second, as an image having 480 pixels in an xs direction and 240 pixels in a ys direction. FIG. 3 does not illustrate the light-transmissive optical element 40. Here, in the projection area 22a of the diffusion portion 22, the xs direction refers to a direction in which light from the light source corresponds to the X direction that is the longer direction of the virtual image 6, and the ys direction refers to a direction in which light from the light source corresponds to the Y direction that is the shorter direction of the virtual image 6.

The laser scanner in the present embodiment turns the orientation of the reflective surface 16a of the light source portion 10 to adjust the projection direction. However, a following projection method can be adopted; mirrors each corresponding to one pixel are arranged in a grid manner, and each of the mirrors is turned on or off to draw an image.

Figure 4:
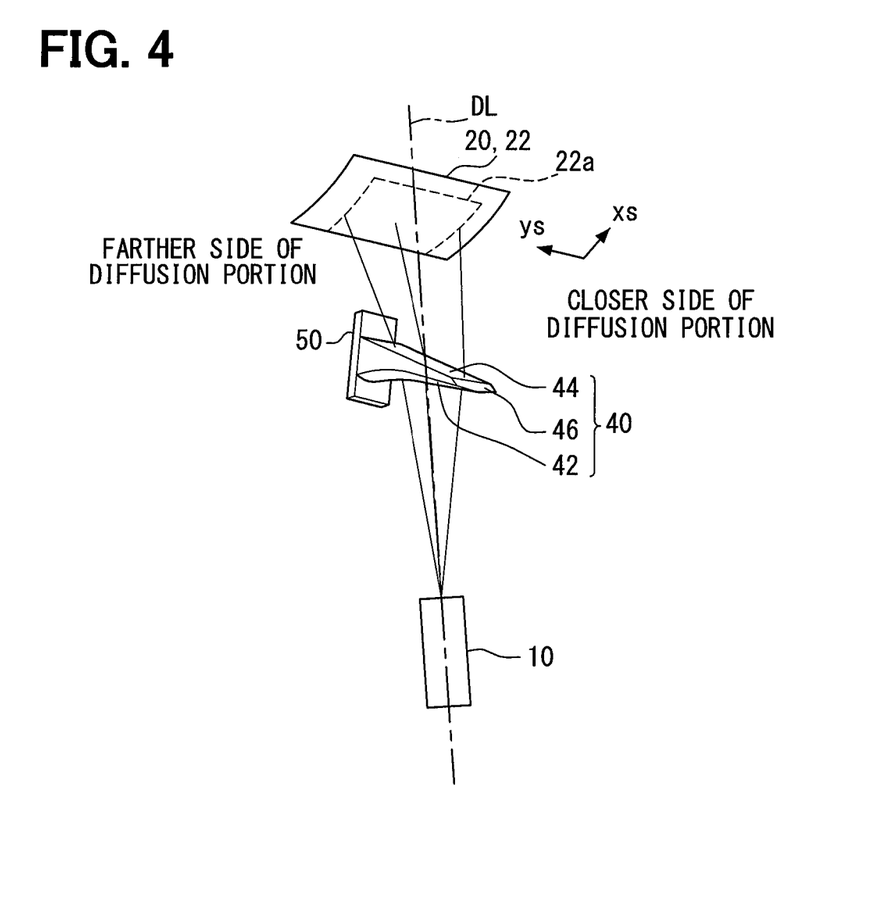
FIG. 4 is a perspective view illustrating the light source portion, a screen member, a light-transmissive optical element, and a light-shield member in the embodiment.
Figure 5:
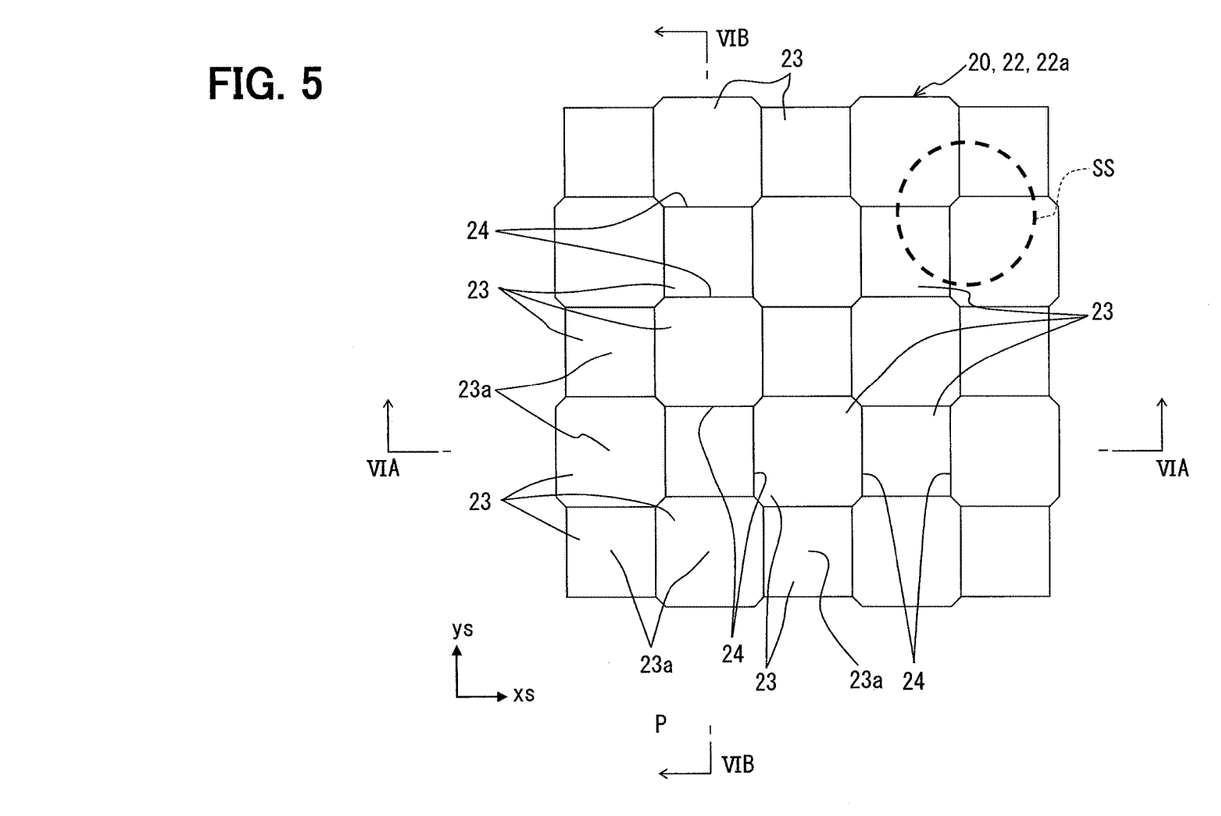
FIG. 5 is a partially-enlarged plan view illustrating the diffusion portion of the screen member.

As illustrated in FIG. 4 to FIG. 6B, the screen member 20 is a reflection-type screen formed by evaporating aluminum on a base material such as synthetic resin or glass. As illustrated in FIG. 5, the screen member 20 has the diffusion portion 22 formed as a micro-mirror array by arranging multiple mirror surfaces 23 in a grid manner. An area of the diffusion portion 22, on which the laser flux is incident from the light source portion 10, is defined as the projection area 22a. FIG. 5 illustrates a spot SS at the time when the laser flux is projected on the diffusion portion 22 in the projection direction, as a broken line.

Figure 6A:
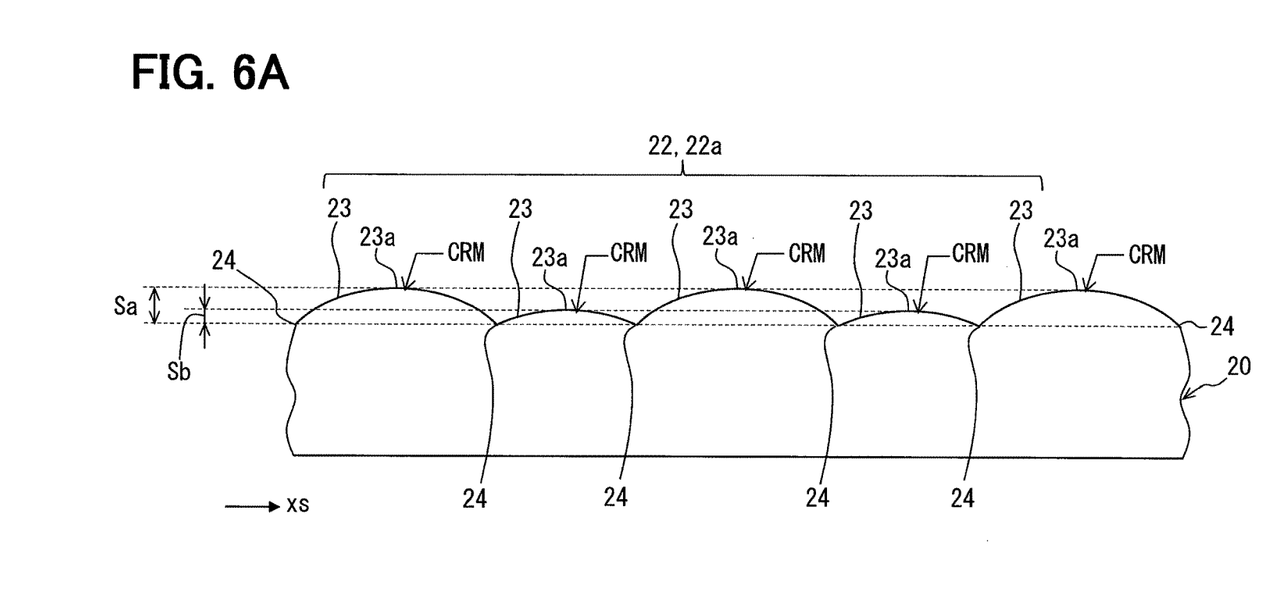
FIG. 6A is a schematic sectional view taken along a line VIA-VIA in FIG. 5.
Figure 6B:
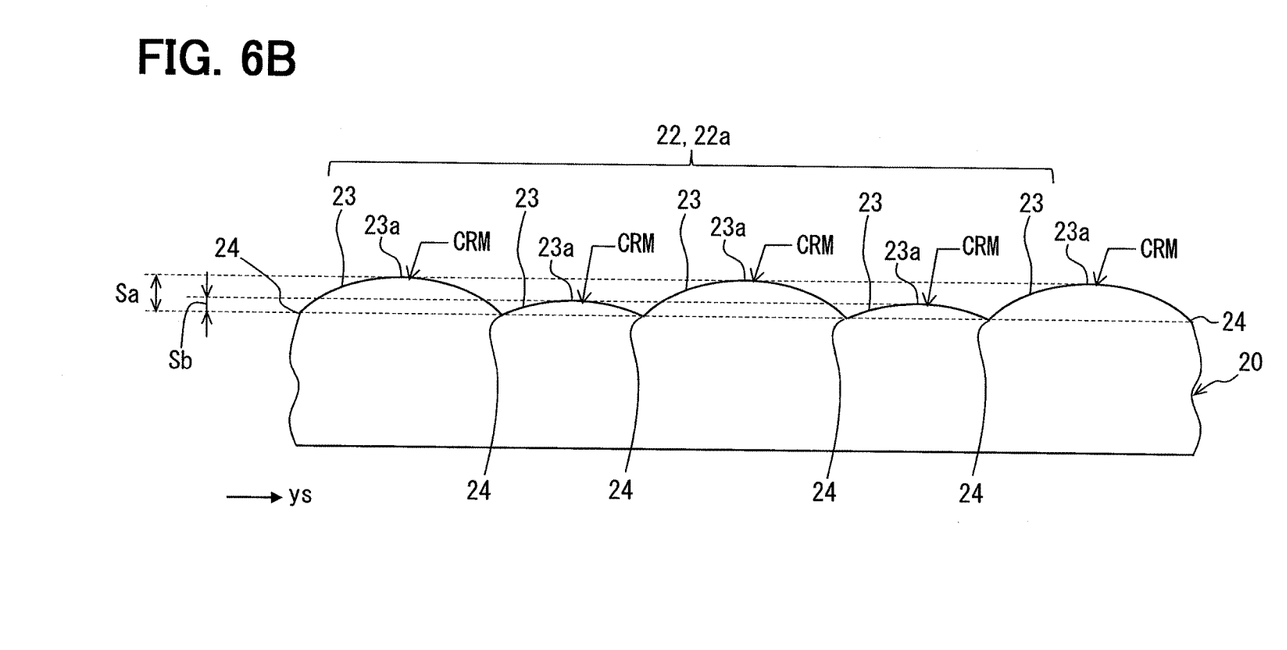
FIG. 6B is a schematic sectional view taken along a line VIB-VIB in FIG. 5.

As illustrated in FIG. 6A and FIG. 6B, the mirror surfaces 23 each are a convex curved surface. It is supposed that a highest protruding point of each mirror surface 23 is defined as an apex 23a. The apexes 23a of the mirror surfaces 23 that are adjacent to each other across a boundary 24 have different heights. That is, the adjacent mirror surfaces 23 have different sag amounts Sa, Sb that are depths from the apex 23a to the boundary 24 (represented by inflection points in cross-sectional views of FIG. 6A and FIG. 6B). When the laser flux is incident on the diffusion portion 22, the laser flux is reflected on the diffusion portion 22, and is diffused with a diffusing angle responsive to curvature radius CRM of the mirror surface 23.

As illustrated in FIG. 4, the screen member 20 is curved in the xs direction. Thus, the diffusion portion 22 is formed to be a cylindrical plane macroscopically that protrudes in the xs direction. The screen member 20 is inclined with respect to a reference line DL in the ys direction. Thus, the diffusion portion 22 is also inclined with respect to the reference line DL in the ys direction. Here, the reference line DL in the present embodiment is a hypothetical line along the projection direction corresponding to the center of the image (for example, central pixel) among projection directions of light projected from the light source portion 10.

The above inclination provides a side on which the diffusion portion 22 is farther from the light source portion 10 and a side on which the diffusion portion 22 is closer to the light source portion 10. In the present embodiment, the side on which the diffusion portion 22 is farther from the light source portion 10 and the side on which the diffusion portion 22 is closer to the light source portion 10 are formed across the reference line DL. Hereinafter, the side on which the diffusion portion 22 is farther from the light source portion 10 is abbreviated as the farther-side of the diffusion portion 22. The side on which the diffusion portion 22 is closer to the light source portion 10 is abbreviated as the closer-side of the diffusion portion 22. Assuming that the diffusion portion 22 is divided by a plane defined by the reference line DL and the xs direction, the side on which the diffusion portion 22 is farther from the light source portion 10 corresponds to the side including a light-shield member, and the side on which the diffusion portion 22 is closer to the light source portion 10 corresponds to the side including no light-shield member (See FIG. 4 and FIG. 7).

Due to the above-mentioned inclination, the light that is projected from the light source and diffused by the screen member 20 does not return to the light source portion 10, and is incident on the concave mirror 30.

The concave mirror 30 illustrated in FIGS. 1 and 2 is formed by evaporating aluminum as a reflection surface 30a on a base material such as synthetic resin or glass. The reflection surface 30a is a smooth curved surface dented at its center. The concave mirror 30 changes the orientation of the light that is projected from the light source and diffused by the screen member, and projects the light onto the windshield 3 via a light-transmissive dustproof cover 72. The concave mirror 30 enlarges the image, and the enlarged image is displayed as a virtual image. Meanwhile, outside light such as sunlight may be incident into the HUD apparatus 100 via the light-transmissive dustproof cover 72, and a part of the light is incident on the screen member 20 via the concave mirror 30.

In response to an electric signal from the electrically-connected controller 60, the concave mirror 30 swings about a swing axis 30b. The concave mirror 30 swings to vertically move a formation position of the virtual image 6 and a visible area 4 where the virtual image is visible to the occupant.

As illustrated in FIGS. 1, 2, and 4, the light-transmissive optical element 40 is an optical element that is disposed between the light source portion 10 and the diffusion portion 22, and adjusts the formation state of the image in the projection area 22a of the diffusion portion 22. The light-transmissive optical element 40 is formed of a base material made of a light-transmissive medium having a larger index of refraction than air, for example, synthetic resin such as acryl or polycarbonate, or glass, and transmits light from the light source portion. Specifically, the light-transmissive optical element 40 has a first optical surface 42, a second optical surface 44, and a side surface 46.

The first optical surface 42 is a smooth surface that is exposed to the light source portion 10, and receives light from the light source portion 10. Specifically, the first optical surface 42 is curved to be dented in the direction from the closer-side of the diffusion portion 22 to the farther-side of the diffusion portion 22 as illustrated in a cross-section in FIG. 7. Describing in more detail, in the cross-section in FIG. 7, the first optical surface 42 has a large curvature radius CR1 and is almost linear on the closer-side of the diffusion portion 22, and has a smaller curvature radius CR1 on the farther-side of the diffusion portion 22, and then, has a larger curvature radius CR1 again on the still farther-side of the diffusion portion 22. The first optical surface 42 is curved to protrude in the direction vertical to the direction from the closer-side of the diffusion portion 22 to the farther-side of the diffusion portion 22 as illustrated in the cross-section in FIG. 8. As a whole, the first optical surface 42 in the present embodiment is a free curved surface. In the present embodiment, due to the above-mentioned inclination, the direction from the closer-side of the diffusion portion 22 to the farther-side of the diffusion portion 22 substantially matches the ys direction, and the direction vertical to the direction from the closer-side of the diffusion portion 22 to the farther-side of the diffusion portion 22 substantially matches the xs direction. The first optical surface 42 is not coated with a dielectric multilayer film or the like and thus, the above-mentioned base material is exposed.

The second optical surface 44 is a smooth surface that is exposed to the diffusion portion 22, and projects light from the light source to the diffusion portion 22. Specifically, the second optical surface 44 is flat in all directions as illustrated in the cross-sections in FIGS. 7 and 8, and is a flat plane as a whole as illustrated in FIG. 4. Also, the second optical surface 44 is not coated with a dielectric multilayer film or the like and thus, the above-mentioned base material is exposed.

Figure 7:
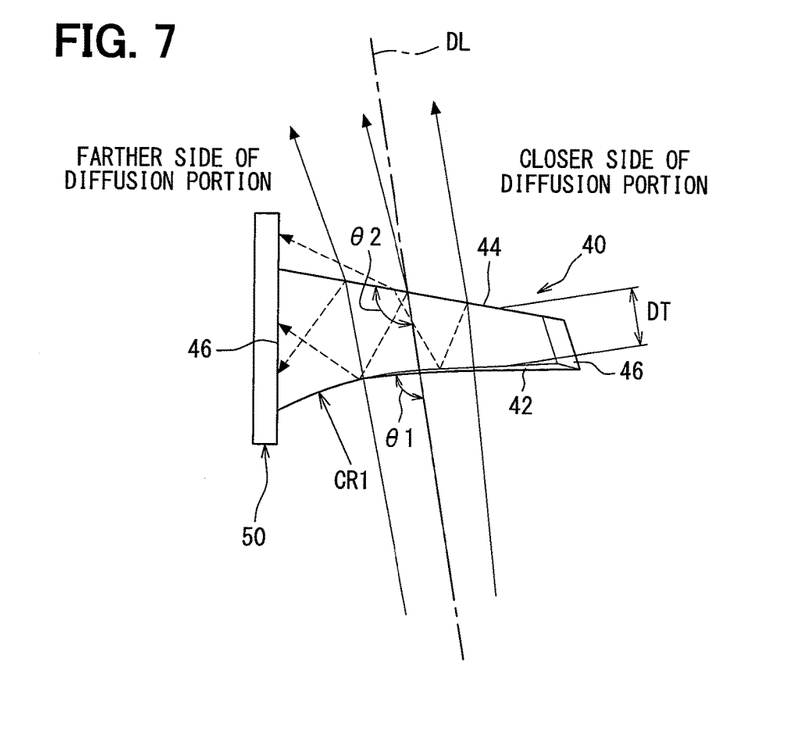
FIG. 7 is a view illustrating the light-transmissive optical element in FIG. 4 along a direction of a reference line and a direction from a closer-side of the diffusion portion to a farther-side of the diffusion portion.
Figure 8:
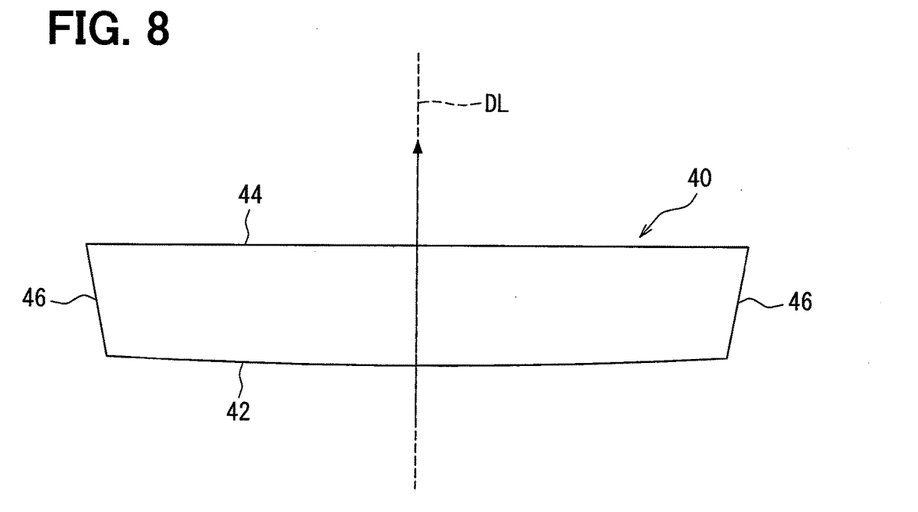
FIG. 8 is a view illustrating the light-transmissive optical element in FIG. 4 along a perpendicular direction to the direction of the reference line and the direction from the closer-side of the diffusion portion to the farther-side of the diffusion portion.

As illustrated in FIG. 7, a distance DT between the first optical surface 42 and the second optical surface 44 increases from the closer-side of the diffusion portion 22 to the farther-side of the diffusion portion 22. By setting the distance DT in this manner, the tangential line of the first optical surface 42 is inclined with respect to the second optical surface 44. Since the first optical surface is dented from the closer-side of the diffusion portion 22 to the farther-side of the diffusion portion 22, the inclination is larger from the closer-side of the diffusion portion 22 toward the farther-side of the diffusion portion 22.

In the light-transmissive optical element 40, the second optical surface 44 is inclined with respect to the reference line DL. Describing in more detail, the second optical surface 44 of the light-transmissive optical element 40 is disposed such that an inclination angle θ2 that the second optical surface 44 forms with the reference line DL on the side of the light source portion 10 and the farther-side of the diffusion portion 22 is an obtuse angle. Thus, a side on which the second optical surface 44 is closer to the light source portion 10 corresponds to the side on which the diffusion portion 22 is closer to the light source portion 10, and a side on which the second optical surface 44 is farther from the light source portion 10 corresponds to the side on which the diffusion portion 22 is farther from the light source portion 10.

In the light-transmissive optical element 40, the first optical surface 42 is disposed such that an inclination angle θ1 that the first optical surface 42 forms with the reference line DL on the side of the light source portion 10 and the farther-side of the diffusion portion 22 is closer to right angle than the inclination angle θ2 of the second optical surface 44.

The side surface 46 of the light-transmissive optical element 40 is formed between an outer edge of the first optical surface 42 and an outer edge of the second optical surface 44. As the reflection-suppressing treatment, the side surface 46 is embossed. As a result, the side surface 46 has a lower regular reflectance than the first optical surface 42 and the second optical surface 44 have. Here, the regular reflectance in the present embodiment means the ratio of light regularly reflected to incident light incident onto a surface.

As illustrated in FIGS. 1, 2, 4, and 7, the light-shield member 50 is a plate-like black bezel made of synthetic resin such as polypropylene. The light-shield member 50 covers the side surface 46 on the farther-side of the diffusion portion 22, that is, on the side which the distance DT between the first optical surface 42 and the second optical surface 44 is larger. The light-shield member 50 protrudes from the second optical surface 44 toward the diffusion portion 22, and protrudes from the first optical surface 42 toward the light source portion 10.

The light-shield member 50 has a larger surface roughness and thus, is more uneven than the first optical surface 42 and the second optical surface 44 are. When light is incident onto the light-shield member 50 thus configured, most of the light is absorbed, and a small quantity of light is reflected diffusely. Although not shown, the light-shield member 50 along with a wing portion extending from the side surface 46 of the light-transmissive optical element 40 is fixed to the housing 70 with a screw.

As illustrated by thin lines indicating laser fluxes that are light from the light source in FIG. 7 as an example, in the HUD apparatus 100, when being incident on the light-transmissive optical element 40, the laser flux from the light source portion 10 is incident on the first optical surface 42 with the above-mentioned small inclination angle θ1 of the first optical surface 42. Then, a portion of the laser flux passes through the second optical surface 44 without being reflected via the medium having a thickness corresponding to the distance DT between the first optical surface 42 and the second optical surface 44, and reaches the diffusion portion 22. Remaining portion of the laser flux is reflected on the second optical surface 44. Such reflected light turns its travelling direction to the farther-side of the diffusion portion 22 with the inclination angle θ2 of the second optical surface 44, and even when being reflected on the first optical surface 42, the light travels to the farther-side of the diffusion portion 22 due to the relationship between the first optical surface 42 and the second optical surface 44. The multiple-reflected light guided to the farther-side of the diffusion portion 22 reaches the light-shield member 50, and is shielded by the light-shield member 50.

In the present embodiment, since the diffusion portion 22 is inclined with respect to the reference line DL, the distance between the light source portion 10 and the diffusion portion 22 varies depending on sites of the image. In the light-transmissive optical element 40 disposed between the light source portion 10 and the diffusion portion 22, the distance DT between the first optical surface 42 near the light source portion 10 and the second optical surface 44 near the diffusion portion 22 increases from the side on which the diffusion portion 22 is closer to the light source portion 10 toward the side on which the diffusion portion 22 is farther from the light source portion 10. Thus, the laser flux that is light from the light source, which passes the farther-side of the diffusion portion 22, passes through the thicker medium, and is focused on the farther side of the second optical surface 44. Therefore, light can be focused at each site of the image in the diffusion portion 22 according to the distance between the light source portion 10 and the diffusion portion 22.

Further, the light that is projected from the light source and reflected on the second optical surface 44, and the light that is projected from the light source and passes through the second optical surface 44 without being reflected due to the first optical surface 42 inclined with respect to the second optical surface 44 reflect in different directions. Thus, the multiple-reflected light from the light source is guided to the side surface 46 of the farther-side of the diffusion portion 22. This can separate the multiple-reflected light from light transmitted from the light source without reflection to suppress noise such as double image. This can provide the HUD apparatus 100 capable of displaying a highly-visible virtual image.

In the present embodiment, the light-shield member 50 that covers the side surface 46 on the farther-side of the diffusion portion 22 shields light from the light source. Thus, multiple-reflected light guided to the side surface 46 on the farther-side of the diffusion portion 22 is shielded by the light-shield member 50, thereby being prevented from interfering with transmitted light from the light source without reflection.

The light-transmissive optical element has the side surface between the first optical surface and the second optical surface, and the light-shield member that covers the side surface and shields light from the light source is provided on the farther-side of the diffusion portion.

In such a head-up display apparatus, the light-shield member that covers the side surface on the farther-side of the diffusion portion shields light from the light source. Thus, multiple-reflected light guided to the side surface on the farther-side of the diffusion portion 22 can be shielded by the light-shield member, thereby being prevented from interfering with transmitted light from the light source without reflection.

In the present embodiment, the light-shield member 50 protrudes from the second optical surface 44 toward the diffusion portion 22. Thus, multiple-reflected light is refracted on the second optical surface 44 and then, is incident onto the light-shield member 50 and shielded, thereby being prevented from interfering with transmitted light from the light source without reflection.

In the present embodiment, the first optical surface 42 is curved to be dented in the direction from the closer-side of the diffusion portion 22 to the farther-side of the diffusion portion 22. Thus, the inclination of the first optical surface 42 with respect to the second optical surface 44 on the farther-side of the diffusion portion 22 can be made large. Light that is projected from the light source and is reflected on the second optical surface 44 and further on the first optical surface 42 is turned to the still farther-side of the diffusion portion 22 to be reflected. In the case of providing the light-shield member 50, light can reach the light-shield member 50 with a small number of reflection times.

The inclination angle θ2 that the second optical surface 44 forms with the reference line DL on the side of the light source portion 10 and on the farther-side of the diffusion portion 22 is an obtuse angle. Thus, since the light that is projected from the light source and reflected on the second optical surface 44 reliably turns its direction to the farther-side of the diffusion portion 22 to be reflected, multiple-reflected light can be separated from light transmitted to the screen member 20 more reliably.

In the present embodiment, the second optical surface 44 is inclined with respect to the reference line DL, the side on which the second optical surface 44 is closer to the light source portion 10 corresponds to the side on which the diffusion portion 22 is closer to the light source portion 10, and the side on which the second optical surface 44 is farther from the light source portion 10 corresponds to the side on which the diffusion portion 22 is farther from the light source portion 10. Thus, in the case where outside light such as sunlight is incident onto the screen member 20 from the windshield 3 as the projection member, when the outside light is reflected on the screen member 20 and then, on the second optical surface 44, a reflection angle on the screen member 20 approaches to a reflection angle on the second optical surface 44. This can suppress image noise that can be generated by the fact that outside light reflected on the second optical surface 44 is incident onto the screen member 20 again, to provide the HUD apparatus 100 capable of displaying a highly-visible virtual image.

In the present embodiment, the second optical surface 44 is flat in the direction from the closer-side of the diffusion portion 22 to the farther-side of the diffusion portion 22. Thus, when outside light is reflected on the screen member 20 and then, on the second optical surface 44, the outside light diffused on the screen member 20 is reflected on the second optical surface 44 without increasing a diffusion angle. Therefore, the outside light reflected on the second optical surface 44 can be easily prevented from being incident onto the screen member 20 again.

In the present embodiment, the side surface 46 is subjected to reflection-suppressing treatment on the farther-side of the diffusion portion 22 to have a lower regular reflectance than the first optical surface 42 and the second optical surface 44. This can prevent light from the light source from being reflected on the side surface 46, and interfering with transmitted light from the light source without reflection.

(Other Embodiments)

Although one embodiment of the present disclosure has been described above, the present disclosure is not limited to the embodiment, and may be applied to various embodiments so as not to deviate from the subject matter of the present disclosure.

Specifically, in a first modification, the light-transmissive optical element 40 may be a triangular prism having a flat first optical surface 42 and a flat second optical surface 44.

In a second modification, the first optical surface 42 is curved to protrude in the direction from the closer-side of the diffusion portion 22 to the farther-side of the diffusion portion 22.

In a third modification, the second optical surface 44 may be curved to be dented in the direction from the closer-side of the diffusion portion 22 to the farther-side of the diffusion portion 22. With this configuration, when outside light diffused on the screen member 20 is reflected on the second optical surface 44, the outside light is condensed in the direction from the closer-side of the diffusion portion 22 to the farther-side of the diffusion portion 22. Accordingly, the outside light reflected on the second optical surface 44 can be prevented more easily from being incident onto the screen member 20 again. The second optical surface 44 may be curved to protrude in the direction from the closer-side of the diffusion portion 22 to the farther-side of the diffusion portion 22.

In a fourth modification, as the reflection-suppressing treatment, the side surface 46 may be coated with black. The side surface 46 may be subjected to reflection-suppressing treatment only on the farther-side of the diffusion portion 22.

In a fifth modification, the side surface 46 may not be subjected to reflection-suppressing treatment on the farther-side of the diffusion portion 22.

In a sixth modification, the inclination angle θ2 that the second optical surface 44 forms with the reference line DL on the side of the light source portion 10 and the farther-side of the diffusion portion 22 may be an acute angle or right angle.

In a seventh modification, the light-shield member 50 may not protrude from the second optical surface 44 toward the diffusion portion 22.

In an eighth modification, in the HUD apparatus 100, only one of the light-shield member 50 and reflection-suppressing treatment may be adopted. The light-shield member 50 and the reflection-suppressing treatment may not be adopted.

In a ninth modification, the first optical surface 42 and the second optical surface 44 may be subjected to coating.

In a tenth modification, the direction from the closer-side of the diffusion portion 22 to the farther-side of the diffusion portion 22 may cross the ys direction. The direction vertical to the direction from the closer-side of the diffusion portion 22 to the farther-side of the diffusion portion 22 cross the xs direction.

In an eleventh modification, the present disclosure may be applied to various mobile objects (transport machines) other than the vehicle 1, for example, a ship and an airplane.

The vehicle 1 is an example of the mobile object. The windshield 3 is an example of the projection member.

While various embodiments, configurations, and aspects of the head-up display apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A head-up display apparatus mounted on a mobile object and projecting an image onto a projection member to display the image as a virtual image visible to an occupant, the head-up display apparatus comprising:
   a light source portion that projects light from a light source;
   a screen member that has a diffusion portion inclined with respect to a hypothetical reference line that extends along a projection direction of the light from the light source, the projection direction corresponding to a center of the image, the diffusion portion diffusing the light from the light source; and
   a light-transmissive optical element that is disposed between the light source portion and the diffusion portion and has a first optical surface exposed to the light source portion and a second optical surface exposed to the diffusion portion, the light-transmissive optical element transmitting the light from the light source,
   wherein:
   a distance between the first optical surface and the second optical surface increases in a direction from a side on which the diffusion portion is closer to the light source portion to a side on which the diffusion portion is farther from the light source portion,
   the light-transmissive optical element has a side surface between the first optical surface and the second optical surface, and
   the head-up display apparatus further comprises a light-shield member that covers the side surface on the side on which the diffusion portion is farther, the light-shield member shielding the light from the light source, wherein
   a horizontal direction of the mobile object is an X direction,
   a vertical direction of the mobile object is a Y direction,
   an xs direction is a direction in which the light from the light source corresponds to the X direction in a projection area of the diffusion portion,
   a ys direction is a direction in which the light from the light source corresponds to the Y direction in the projection area of the diffusion portion, and
   in the diffusion portion divided by a plane defined by the reference line and the xs direction, a side including the light-shield member is the side on which the diffusion portion is farther from the light source portion, and a side without including the light-shield member is the side on which the diffusion portion is closer to the light source portion.

2. The head-up display apparatus according to claim 1, wherein:
   the light-shield member protrudes from the second optical surface toward the diffusion portion.

3. The head-up display apparatus according to claim 1, wherein:
   the first optical surface is curved to be dented in a direction from the side on which the diffusion portion is closer to the side on which the diffusion portion is farther.

4. The head-up display apparatus according to claim 1, wherein:
   an inclination angle that the second optical surface forms with the reference line on a side of the light source portion and the side on which the diffusion portion is farther is an obtuse angle.

5. The head-up display apparatus according to claim 1, wherein:
   the diffusion portion diffuses the light by reflecting the light from the light source;
   the second optical surface is inclined with respect to the reference line; and
   a side on which the second optical surface is closer to the light source portion corresponds to the side on which the diffusion portion is closer to the light source portion, and a side on which the second optical surface is farther from the light source portion corresponds to the side on which the diffusion portion is farther from the light source portion.

6. The head-up display apparatus according to claim 5, wherein:
   the second optical surface is flat or curved to be dented in the direction from the side on which the diffusion portion is closer to the light source portion to the side on which the diffusion portion is farther from the light source portion.

7. The head-up display apparatus according to claim 1, wherein:
   the light-transmissive optical element has a side surface between the first optical surface and the second optical surface; and
   the side surface is performed with a reflection-suppressing treatment on the side on which the diffusion portion is farther, and has a lower regular reflectance than the first optical surface and the second optical surface.

* * * * *